Oct. 7, 1969
J. L. BOON
3,471,229
OPTIC AXIS OR LIGHT PATH ADJUSTING SYSTEM
FOR SLIDE PROJECTORS
Filed Feb. 13, 1967
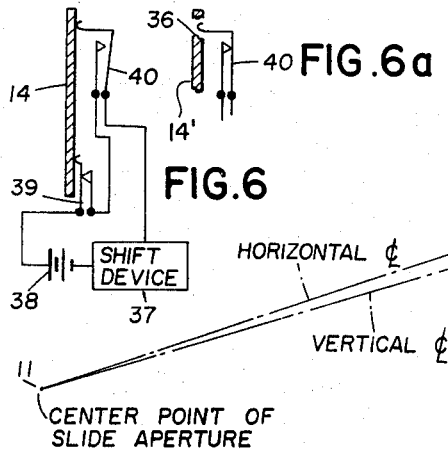
FIG.6
FIG.6a
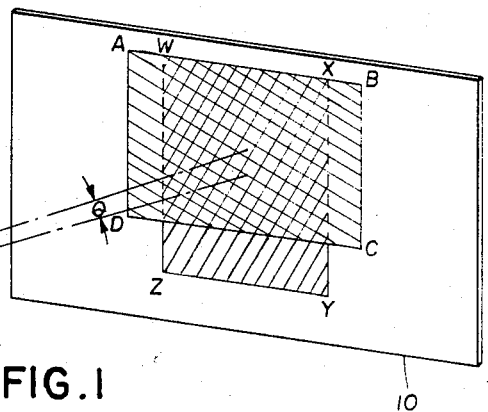
FIG.1
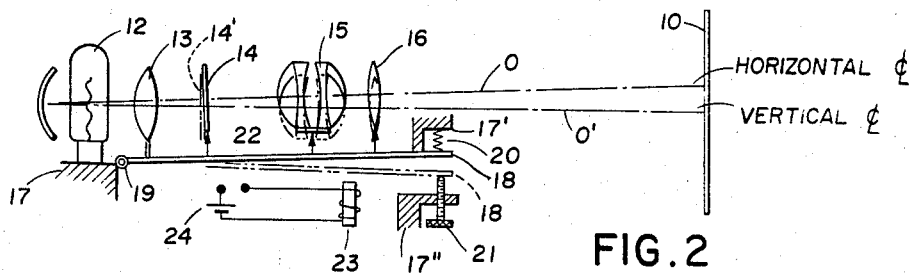
FIG.2
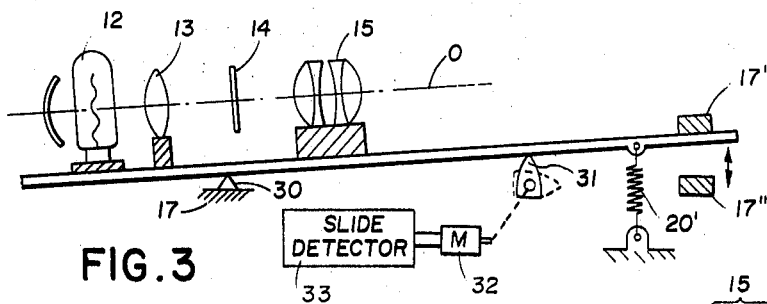
FIG.3
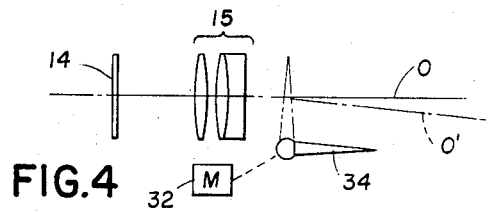
FIG.4
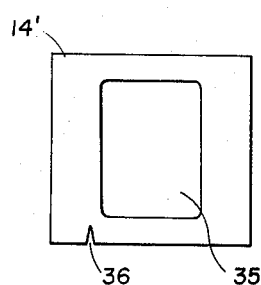
FIG.5
JOSEPH L. BOON
INVENTOR.
BY *Steve W. Greenbaum*
*Robert W. Hampton*
ATTORNEYS United States Patent Office 3,471,229
Patented Oct. 7, 1969

3,471,229
OPTIC AXIS OR LIGHT PATH ADJUSTING
SYSTEM FOR SLIDE PROJECTORS
Joseph L. Boon, Rochester, N.Y., assignor to Eastman
Kodak Company, Rochester, N.Y., a corporation of
New Jersey
Filed Feb. 13, 1967, Ser. No. 615,752
Int. Cl. G03b 21/28, 21/14
U.S. Cl. 353—81                                    10 Claims

ABSTRACT OF THE DISCLOSURE

A slide projector having an optic axis or light path adjusting system responsive to a characteristic on each slide mount. The characteristic indicates whether the scene is horizontally or vertically oriented. The optic axis is either adjusted physically, through the use of an electromagnet or a cam, or is deflected by a refracting prism. The adjustment is such that a horizontal edge of both the vertically and horizontally oriented scenes define a single common line, when projected in succession, on a screen.

BACKGROUND OF THE INVENTION

The present invention relates to slide projectors, and more particularly to such projectors in which the optic axis or light path is adjustable to project both horizontal and vertical scenes to a desired screen image position as instructed by a characteristic associated with each slide.

In the projection of slides it is frequently desirable to have the screen image as near to the ceiling of the home or hall as possible so as to reduce the interference of the heads of the audience with the projection beam. When intermixed horizontal and vertical scenes are projected in sequence, the horizontal scenes which are generally more numerous cannot be presented at the highest area of the screen because the projector is positioned to place the tops of the vertical scenes at the top of the screen.

The present invention includes within its scope a projector in which each slide to be projected is provided with a detectable characteristic indicative of the orientation of the scene in the slide. The detectable characteristic may take any of many well known forms from the sophisticated such as magnetic ink to the simple such as a notch or the absence thereof on an edge of the slide. The apparatus to be described for disclosing the invention utilizes a notch in the vertically oriented slides and the absence of a notch in the slides having horizontal scenes. The projector is provided with an adjusting mechanism responsive to such characteristic for adjusting the optic axis or light path of the projector for properly positioning the projected image.

SUMMARY OF THE INVENTION

An important object of the invention is to provide a slide projector which under the control of the slides will always show the top edge of the projected picture at the same location on the screen, usually the top, whether the slide depicts a horizontal scene or a vertical scene, it being understood that the picture portion of the slides is rectangular in shape with its major dimension in the direction the scene is oriented.

BRIEF DESCRIPTION OF THE DRAWINGS

The invention as well as other objects and advantages thereof will be understood from the following description when read in connection with the accompanying drawing in which:

FIG. 1 shows in superposed relation the desired positions on a screen of vertical and horizontal scenes;

FIG. 2 is a schematic showing in side elevation of the entire light path and means for shifting said path under the control of a slide;

FIG. 3 is a side elevation similar to that of FIG. 2 showing another arrangement for shifting the light path;

FIG. 4 is a diagrammatic view showing how the light path may be shifted by optical means;

FIG. 5 illustrates a vertical scene slide provided with a detectable characteristic; and FIGS. 6 and 6A are fragmentary conventionalized plan views partly in section of one form of actuator for a path-shift device.

DESCRIPTION OF THE PREFERRED EMBODIMENTS

In slide projectors, the optical system is best utilized by positioning the center of the slide aperture in the center of the light path, i.e., on the optic axis, of the projector. To accomplish the object of the invention of always locating the top of a projected picture at the top of a screen lying in a predetermined plane, it is evident from FIG. 1 that the center points of projected horizontally and vertically oriented scenes or film frames do not coincide on a screen 10 but subtend a small angle 0 in a vertical plane at the center point 11 of a slide aperture. The two presentations superposed on screen 10 shown in FIG. 1 represent a horizontal type picture ABCD projected from a horizontally oriented film frame and a vertical type picture WXYZ projected from a vertically oriented film frame with their top edges AB and WX, respectively, falling on a single line. Therefore, in order to preserve the best use of the optical system, it is necessary to shift the optic axis is a vertical plane when changing from the projection of a horizontal scene or frame to that of a vertical scene. The shift in the optic axis at the image plane equals half the difference between the two dimensions of the image. Inasmuch as horizontal scenes are usually more prevalent than are vertical scenes, the projector is so arranged that in its normal position it properly positions horizontal scenes, and is temporarily moved to another position when so instructed by a detectable characteristic such as a notch in slides mounting a vertical scene.

The projector incorporating the embodiment of the invention shown in FIG. 2 includes an optical system in which light from a source 12 is collected by a condenser lens 13 and concentrated on a slide 14 suitably supported (by means not shown) centered on an optic axis O established by the condenser lens 13 and an objective lens 15 which projects an image of slide 14 onto a screen 10. For short screen distances, it may be desirable to use a collimating lens 16 as shown in FIG. 2 on the long optical side of lens 15 so as to bring screen 10 within the limits of the drawing. For convenience of description, only those parts of the projector necessary for an understanding of the invention are shown in FIG. 2. Three portions of the base 17, 17' and 17" supporting the projector are included to illustrate the operation and adjustment of means for shifting the optic axis O. The light source 12 is mounted on a portion of base 17 to which a plate 18 is pivotally mounted as by a hinge 19 for angular movement in a vertical plane between upper and lower positions determined by base positions 17' and 17", either or both of which positions may be adjustable. As shown in FIG. 2, the optical system including lenses 13, 15 and 16 and slide 14 are supported by and movable with plate 18 which is biased by a spring 20 to its upper position against base portion 17'. The lower position of plate 18 is determined by the adjustment of a set screw 21 in threaded engagement with base position 17". The plate 18 is moved to its lower position whenever feeler contacts 22 detect a vertical slide 14' and electrically connect the winding of an electromagnet 23 to a source of power such as a battery 24 energizing electromagnet 23 to attract the plate 18 as its armature. The feeler contacts 22 may consist of the arrangement shown in FIG. 6 and described below.

In using the projector of FIG. 2, it is set up and adjusted in the usual manner so that its optic axis O intersects the screen 10 at the desired point. The set screw 21 is adjusted so that with plate 18 in engagement therewith (see broken lines in FIG. 2) the optic axis O is in its lower position, and intersects the screen at the point desired as discussed in connection with FIG. 1. The adjustment of the set screw 21 makes it possible to accommodate projection lenses 15 of different focal lengths, the angle at which the projector is set, etc.

The projector shown in FIG. 3 differs from the one described above in connection with FIG. 2 primarily in that its plate 18' tilts or rocks between base portions 17' and 17" on a knife-edge 30 supported by base portion 17, and is biased by gravity or a tensioned spring 20' to its lower position. Plate 18' is moved to and maintained in its upper position against base portion 17' by a cam 31 under the control of a motor 32 which rotates cam 31 as instructed by a slide-type detecting device 33. It will be noted that the angle of the entire optical system including light source 12 is shifted for accomplishing the desired positioning of projected images of horizontal and vertical slides.

The desired angular shift in the optic axis or light path relative to screen 10 may be accomplished optically as shown in FIG. 4 by providing a prism 34 on the long optical side of projection lens 15. The prism 34 is so positioned when in use that the light ray from the center of a slide passes through prism 34 at an angle of minimum deviation which minimizes distortion. Since the light rays leaving lens 15 are nearly parallel, prism 34 does not interfere with the formation of the image on screen 10. Preferably, prism 34 is introduced into the light path as indicated by broken lines only when a vertically oriented slide 14' is projected, and for this purpose motor 32 may be employed as described in connection with FIG. 3.

FIG. 5 shows a slide 14' having a vertically oriented scene or picture 35 and provided with a notch 36 as its detectable characteristic.

One arrangement suitable for shifting the projected light path under the control of the slide being projected is shown in FIGS. 6 and 6A in which a shift device 37 of any electric operative type is series connected with a battery 38, normally open spring contacts 39 and normally closed spring contacts 40 whereby the shift device 37 remains unenergized. As indicated in FIG. 6A, a slide 14' having a notch 36 does not open the normally closed contacts 40 but does close the normally open contacts 39 the same as an unnotched slide 14 as shown in FIG. 6, and therefore the shift device is energized to perform its intended function. The normally open spring contacts 39 disable the circuit to shift device 37 when no slide is present in the projector.

The preferred embodiments described for disclosing the invention are incorporated in a slide projector which, per se, remains stationary after initial set-up and adjustment. However, the object of the invention obviously may be attained by an accessory device such as a simple unit upon which an ordinary projector is placed and which is tiltable in the same general manner as plate 18' in the embodiment of FIG. 3.

It is to be understood that the invention is not limited to the details shown since various modifications and structural changes may be made without in any way departing from the spirit of the invention, the scope of which is pointed out in the appended claims.

I claim:

1. In a projector for projecting in sequence rectangular horizontally and vertically oriented images on film frames, each film frame of which is provided with a detectable characteristic indicative of the orientation of its particular image, and having a lens having an optical axis substantially aligned with the center of the image of a film frame for projecting the image onto a predetermined plane wherein the image defines a horizontal edge, the improvement comprising:

means responsive to the detectable characteristic provided on the film frame for automatically shifting said optical axis in a substantially vertical plane between two positions to effect vertical displacement of the projected image and selectively to cause the horizontal edge of each of the horizontally and vertically oriented projected images to define a single common line on said predetermined plane as such images are projected in sequence.

2. In a projector in accordance with claim 1 wherein adjusting means are provided for the optical axis shifting means for limiting the vertical displacement of the projected image between the two positions to half the difference between the major and minor dimensions of the projected image.

3. In a projector in accordance with claim 1 wherein said one of the horizontal edges comprises the upper edge thereof.

4. The invention in accordance with claim 1 wherein the projector has an optical system including a lamp and said lens, and said optic axis shifting means includes means for tilting said optical system between said two positions.

5. The invention according to claim 1 wherein said lens is mounted on a movable member, and said optic axis shifting means comprises an electromagnet coupled to said movable member for moving said member between said two positions.

6. A slide projector adapted to project in sequence rectangular horizontally and vertically oriented images of film frames mounted in apertured slide mounts, each mount of which is provided with a detectable characteristic indicative of the orientation of its particular image, and having a stationary objective lens having an optical axis for projecting a first image of a frame centered on said optic axis onto a predetermined plane with a horizontal edge of said projected first image defining a first line on said predetermined plane, the improvement comprising:

an optical element movable into and out of said optical axis and adapted when in said optic axis to selectively redirect light emerging from said lens to produce a vertical displacement of a projected second image to cause a horizontal edge of the projected second image to define a second line on said predetermined plane coincident with said first line, and means responsive to the detectable characteristic provided on the film frame for controlling movement of said optical element into and out of said optical axis.

7. The invention according to claim 6 wherein said horizontal edges of the projected first and second images comprises the upper edges thereof.

8. The invention according to claim 6 wherein said optical element when in said optic axis is positioned between said objective lens and said predetermined plane.

9. The invention according to claim 6 wherein said optical element comprises a prism.

10. The invention according to claim 1 wherein said projector is a slide projector, and each film frame is mounted in a slide mount.

References Cited

UNITED STATES PATENTS

| | | |
|---|---|---|
| 1,680,534 | 8/1928 | Garbutt et al. |
| 2,777,357 | 1/1957 | Goldberg. |
| 3,016,793 | 1/1962 | Armbruster. |

NORTON ANSHER, Primary Examiner

WAYNE A. SIVERTSON, Assistant Examiner

U.S. Cl. X.R.

353—100